UNITED STATES PATENT OFFICE.

CURTIS C. MEIGS, OF PHILADELPHIA, PENNSYLVANIA.

PROCESS OF PRODUCING DOUBLE SUPERPHOSPHATE.

1,351,672.

Specification of Letters Patent.

Patented Aug. 31, 1920.

No Drawing.

Application filed October 28, 1919. Serial No. 333,955.

*To all whom it may concern:*

Be it known that I, CURTIS C. MEIGS, a citizen of the United States, residing at Philadelphia, in the county of Philadelphia and State of Pennsylvania, have invented certain new and useful Improvements in Processes of Producing Double Superphosphate, of which the following is a specification.

This invention relates to an improved process of producing double super-phosphate, that is, a phosphate containing about 50 per cent. of $P_2O_5$.

Heretofore, double super-phosphate has been produced by mixing phosphate rock with sulfuric acid in accordance with the usual practice in making ordinary super-phosphate, leaching out the phosphoric acid, concentrating such acid, and then treating the ground phosphate rock therewith. This process is very troublesome and expensive. In making the ordinary super-phosphate, considerable amounts of lime, alumina and silica are liberated, causing a great deal of trouble in filtering. Furthermore, the apparatus is injuriously affected by the phosphoric acid and the materials are difficult to handle.

These disadvantages are overcome in the present method by which it is possible to obtain double superphosphate in a simple and economical manner and to avoid the difficulties which are encountered if the phosphate is treated with a full charge of sulfuric acid, in accordance with the usual practice of making super-phosphate.

In the practice of my process according to the preferred procedure, phosphate rock is ground and mixed with about one-half the usual amount of sulfuric acid employed in making super-phosphate. To one ton of rock, I prefer to add about 900 pounds of sulfuric acid of 52° Bé. The principal reaction which occurs is indicated by the following equation:

1. $Ca_3(PO_4)+H_2SO_4=$
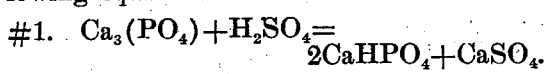
$2CaHPO_4+CaSO_4.$

The resulting product consisting principally of dicalcium phosphate and calcium sulfate, is then mixed with a solution of any desired strength of sodium sulfate in the preferred proportions of 100 pounds of the dicalcium phosphate to 80 pounds of the sodium sulfate and the mixture heated in a digester, preferably to a temperature of about 230° F., and preferably under a superatmospheric pressure of about 30 pounds. The reaction which occurs is indicated by the following equation:

2. $CaHPO_4+Na_2SO_4=$
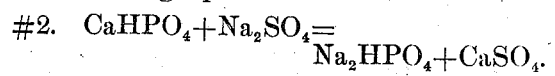
$Na_2HPO_4+CaSO_4.$

The entire products of the reaction are discharged into a filter press, preferably a Kelly filter press, and filtered therein. The filtrate is delivered to a second digester where it is similarly caused to react with an additional charge consisting of a like amount of dicalcium phosphate. The filter cake is discharged back into the first digester where it is again similarly treated with another charge consisting of a like amount of sodium sulfate. The material in the second digester is then filtered and the filtrate consisting principally of a solution of disodium phosphate and sodium sulfate is delivered to an evaporator. Similarly, the material in the first digester is filtered and the filtrate consisting principally of a solution of disodium phosphate and sodium sulfate is delivered to the said evaporator.

From this description, it will be seen that each charge of dicalcium phosphate is treated twice and in substantially the same way with sodium sulfate, the dicalcium phosphate being first treated with the fresh sodium sulfate solution and then with the sodium sulfate containing liquor from the filter press. The calcium sulfate after the second treatment, in the digester, as described, is discarded.

The liquor delivered to an evaporator is heated therein and the sodium sulfate salted out. This material is used over again to make up additional solutions for the digesters. Disodium phosphate is now separated from the solution from which the sodium sulfate was removed, preferably by crystallization, the mother liquor being returned to the evaporator where it is mixed with the filtrates from the first and second digesters referred to, and again treated as described. For the use to which the separated crystals are to be put, it is not necessary to subject them to any purifying process.

The resulting crystals are delivered to a drier where they are heated to a temperature of at least 100° F., preferably to a temperature of 212° F., and 11 molecules of water are driven off from the disodium phosphate, as indicated by the following equation:

3. $Na_2HPO_4.12H_2O + Heat = Na_2HPO_4.H_2O + 11H_2O$.

The resulting crystals are then delivered to a digester where they are subjected to the action of 33 per cent. hydrochloric acid in the preferred proportions of 220 pounds of the acid to 153 pounds of the disodium phosphate. The principal reaction which occurs is indicated by the following equation:

4. $2Na_2HPO_4 + 4HCl = 4NaCl + 2H_3PO_4$.

The salt, sodium chlorid, which separates out at this point, is later subjected to the action of neutral sodium sulfate and the remaining solution which contains phosphoric acid, $H_3PO_4$, is used in treating fresh ground calcium phosphate. As the solution contains only about 30 per cent. of phosphoric acid the resulting phosphate mixture is very wet and it is delivered to a drier where the moisture is driven off and double super-phosphate of about 50 per cent. $P_2O_5$ obtained ready for delivery to a bagging machine or storage warehouse.

To the salt, sodium chlorid, recovered in the reaction indicated above is added sodium acid sulfate, in the preferred proportions indicated by the following equation:

5. $NaHSO_4 + NaCl = Na_2SO_4 + HCl$.

The hydrochloric acid gas is driven off by heat and the sodium sulfate is mixed with sulfuric acid as indicated in the following equation:

6. $Na_2SO_4 + H_2SO_4 = 2NaHSO_4$.

The resulting sodium acid sulfate is used in the reaction given above as No. 5.

In the practice of my process, it is important to employ a materially smaller amount of sulfuric acid than is used in the ordinary process of producing super-phosphate and it is important to produce disodium phosphate free from lime, in the second step of the process.

While I have described in detail the preferred practice of my process and the preferred proportions and details of proceedure, it is to be understood that my process is not strictly limited thereto, except as set forth in the subjoined claims.

Having thus described my invention, I claim:

1. The herein described process of producing double super-phosphate which consists in treating phosphate rock with about one-half the amount of acid used in producing ordinary super-phosphate, treating the resulting mass with an excess of a solution of an alkali metal sulfate to produce a dialkali metal phosphate, filtering the products of the reaction, separating the free alkali metal sulfate from the filtrate, subjecting the remaining liquid to crystallization, separating the crystals formed, heating such crystals to a temperature of at least 100° F., subjecting the product to the action of dilute hydrochloric acid, subjecting phosphate rock to the action of the resulting solution, and drying the resulting product.

2. The herein described process of producing double super-phosphate, which consists in treating phosphate rock with about one-half the amount of acid used in producing ordinary super-phosphate, treating the resulting mass with an excess of a solution of sodium sulfate to produce disodium phosphate, filtering the products of the reaction, separating the free sodium sulfate from the filtrate, subjecting the remaining liquid to crystallization, separating the crystals formed, heating such crystals to a temperature of at least 100° F., subjecting the product to the action of dilute hydrochloric acid, subjecting phosphate rock to the action of the resulting solution, and drying the resulting product.

3. The herein described process of producing double super-phosphate, which consists in treating phosphate rock with about one-half the amount of acid used in producing ordinary super-phosphate whereby dicalcium phosphate is obtained, treating the resulting mass with an excess of a solution of sodium sulfate to produce disodium phosphate, filtering the products of the reaction, treating the filter cake with an additional charge of a solution of sodium sulfate, treating the filtrate with an additional charge of the said dicalcium phosphate, filtering the products of the last named reactions, separating the free sodium sulfate from the filtrate, subjecting the remaining liquid to crystallization, separating the crystals formed, heating such crystals to a temperature of at least 100° F., subjecting the product of the action of dilute hydrochloric acid, subjecting phosphate rock to the action of the resulting solution, and drying the resulting product.

4. The herein described process of producing double super-phosphate which consists in treating phosphate rock with about one-half the amount of acid used in producing ordinary super-phosphate, treating the resulting mass under super-atmospheric pressure with an excess of a solution of an alkali metal sulfate to produce a dialkali metal phosphate, filtering the products of the reaction, separating the free alkali metal sulfate from the filtrate, subjecting the remaining liquid to crystalliation, separating the crystals formed, heating such crystals to a temperature of at least 100° F., subjecting the product to the action of dilute hydrochloric acid, subjecting phosphate rock to the action of the resulting solution, and drying the resulting product.

5. The herein described process of producing double super-phosphate, which consists in treating phosphate rock with about one-half the amount of acid used in producing ordinary super-phosphate, treating the resulting mass under super-atmospheric pressure with an excess of a solution of sodium sulfate to produce disodium phosphate, filtering the products of the reaction, separating the free sodium sulfate from the filtrate, subjecting the remaining liquid to crystallization, separating the crystals formed, heating such crystals to a temperature of at least 100° F., subjecting the product to the action of hydrochloric acid, subjecting phosphate rock to the action of the resulting solution, and drying the resulting product.

6. The herein described process of producing double super-phosphate, which consists in treating phosphate rock with about one-half of the amount of acid used in producing ordinary super-phosphate whereby dicalcium phosphate is obtained, treating the resulting mass under super-atmospheric pressure with an excess of a solution of sodium sulfate to produce disodium phosphate, filtering the products of the reaction, treating the filter cake with an additional charge of a solution of sodium sulfate, treating the filtrate with an additional charge of the said dicalcium phosphate, filtering the products of the last named reactions, separating the free sodium sulfate from the filtrate, subjecting the remaining liquid to crystallization, separating the crystals formed, heating such crystals to a temperature of at least 100° F., subjecting the product to the action of dilute hydrochloric acid, subjecting phosphate rock to the action of the resulting solution, and drying the resulting product.

In testimony whereof I affix my signature in presence of two witnesses.

CURTIS C. MEIGS.

Witnesses:
F. M. O'HARA,
A. P. BEATTIE.